United States Patent [19]

Spies

[11] Patent Number: 5,585,625
[45] Date of Patent: Dec. 17, 1996

[54] ARRANGEMENT FOR DETECTING THE OCCUPANCY OF A SEAT IN VEHICLES AND THE LIKE

[75] Inventor: Martin Spies, Pfaffenhofen, Germany

[73] Assignee: Temic Telefunken microelectronic GmbH, Heilbronn, Germany

[21] Appl. No.: 440,223

[22] Filed: Jan. 11, 1995

[30] Foreign Application Priority Data

Jan. 12, 1994 [DE] Germany .................. 44 00 664.0

[51] Int. Cl.⁶ .................................................. G08B 13/194
[52] U.S. Cl. .................................. 250/221; 250/DIG. 1; 340/556
[58] Field of Search .......................... 250/221, 208.1, 250/DIG. 1; 340/555, 556, 557, 573; 180/272; 356/376

[56] References Cited

U.S. PATENT DOCUMENTS 4,683,373  7/1987  Tupman ........................... 250/221

FOREIGN PATENT DOCUMENTS

| | | |
|---|---|---|
| 0473324 | 3/1992 | European Pat. Off. . |
| 4005598 | 8/1991 | Germany . |
| 4112579 | 10/1991 | Germany . |
| 4112934 | 10/1992 | Germany . |
| 2236419 | 4/1991 | United Kingdom . |

Primary Examiner—Edward P. Westin
Assistant Examiner—Kevin Pyo
Attorney, Agent, or Firm—Spencer & Frank

[57] ABSTRACT

Arrangement for detecting the occupancy of a seat for safety systems having a plurality of light emitters, which are imaged onto the seat via an optical unit and the luminous spots created there are imaged via a further optical unit onto a photodetector field. The contour is acquired with a microprocessor via the evaluation of the position of these luminous spots on the photodetector field, and thus the type of occupancy is determined. This information can be supported via passive IR detectors for the acquisition of the temperature differential.

19 Claims, 2 Drawing Sheets

ARRANGEMENT FOR DETECTING THE OCCUPANCY OF A SEAT IN VEHICLES AND THE LIKE

CROSS-REFERENCE TO RELATED APPLICATION

This application claims the priority of Patent Application Ser. No. P 44 00 664.0 filed on Jan. 12, 1994, in the Federal Republic of Germany, the subject matter of which is incorporated herein by reference.

BACKGROUND OF THE INVENTION

There exist a number of arrangements for detecting the occupancy of a seat, which function on the basis of any of the following methods:

Mats in the seat area with pressure detection

Pressure detection at seat frame

Making use of a high-frequency attenuation

Making use of the change in capacitance

These above systems have the disadvantages that, they cannot sufficiently distinguish the type of seat occupancy and they are not capable of detecting the presence of such objects as child seats.

SUMMARY OF THE INVENTION

It is the object of the present invention to propose a simpler and less expensive configuration for a device for the acquisition of the image of a vehicle seat in an arrangement for detecting the occupancy of a seat in vehicles and the like.

This object and others are achieved by the arrangement of the invention in which a plurality of light emitters are provided for the purpose of image acquisition, which light emitters are directed at the seat in order to acquire the contour of the seat in the form of luminous spots, and in which a photodetector field (array) is arranged at a defined distance from the seat, onto which field the luminous spots are imaged.

BRIEF DESCRIPTION OF THE DRAWINGS

These and other features and advantages of the invention will be further understood from the following detailed description of the preferred embodiments with reference to the accompanying a drawings in which.

DETAILED DESCRIPTION OF THE PREFERRED EMBODIMENTS

Figure 1:
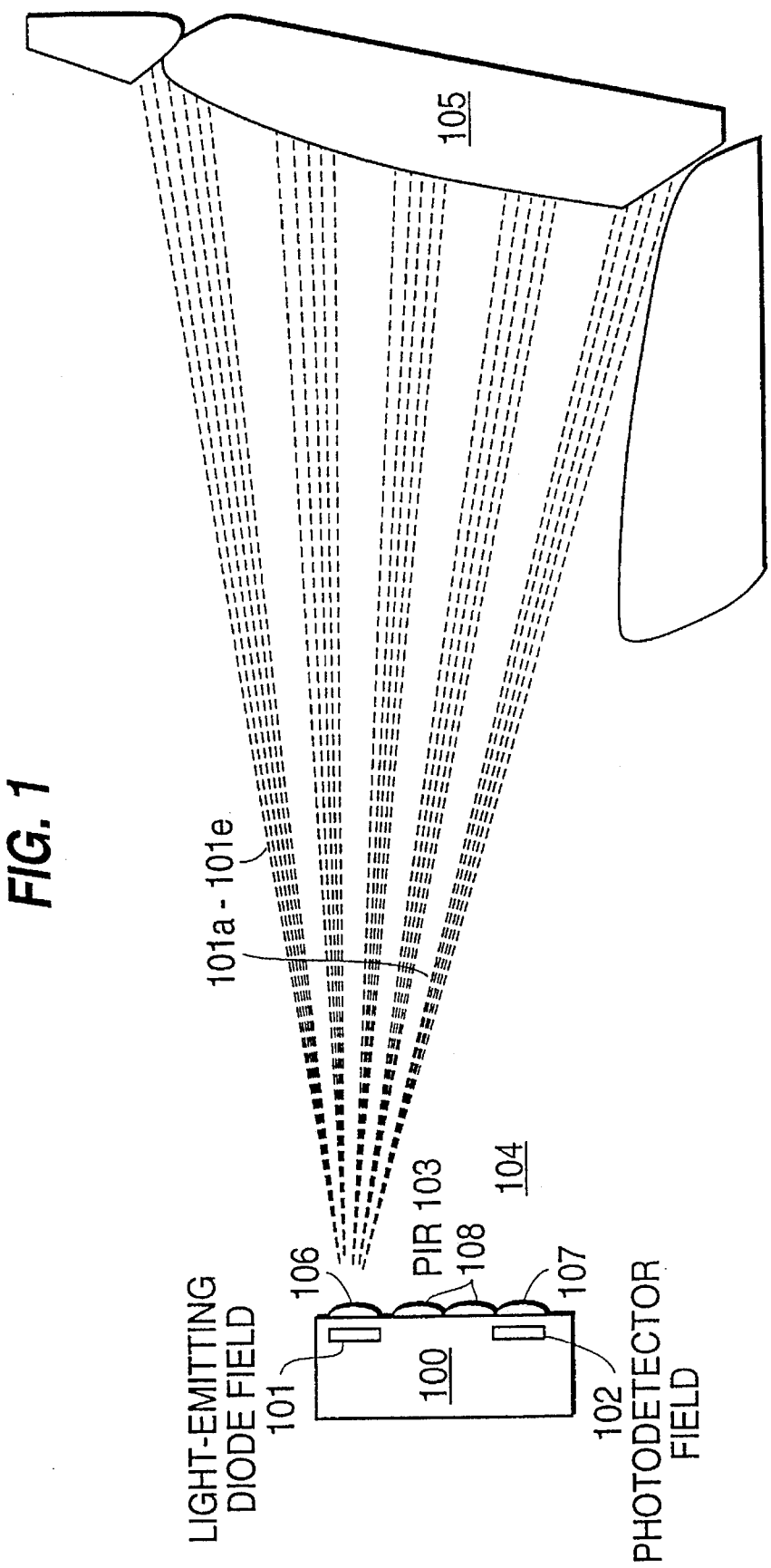
FIG. 1 is a schematic illustration of a device for detecting the occupancy of a seat.
Figure 2:
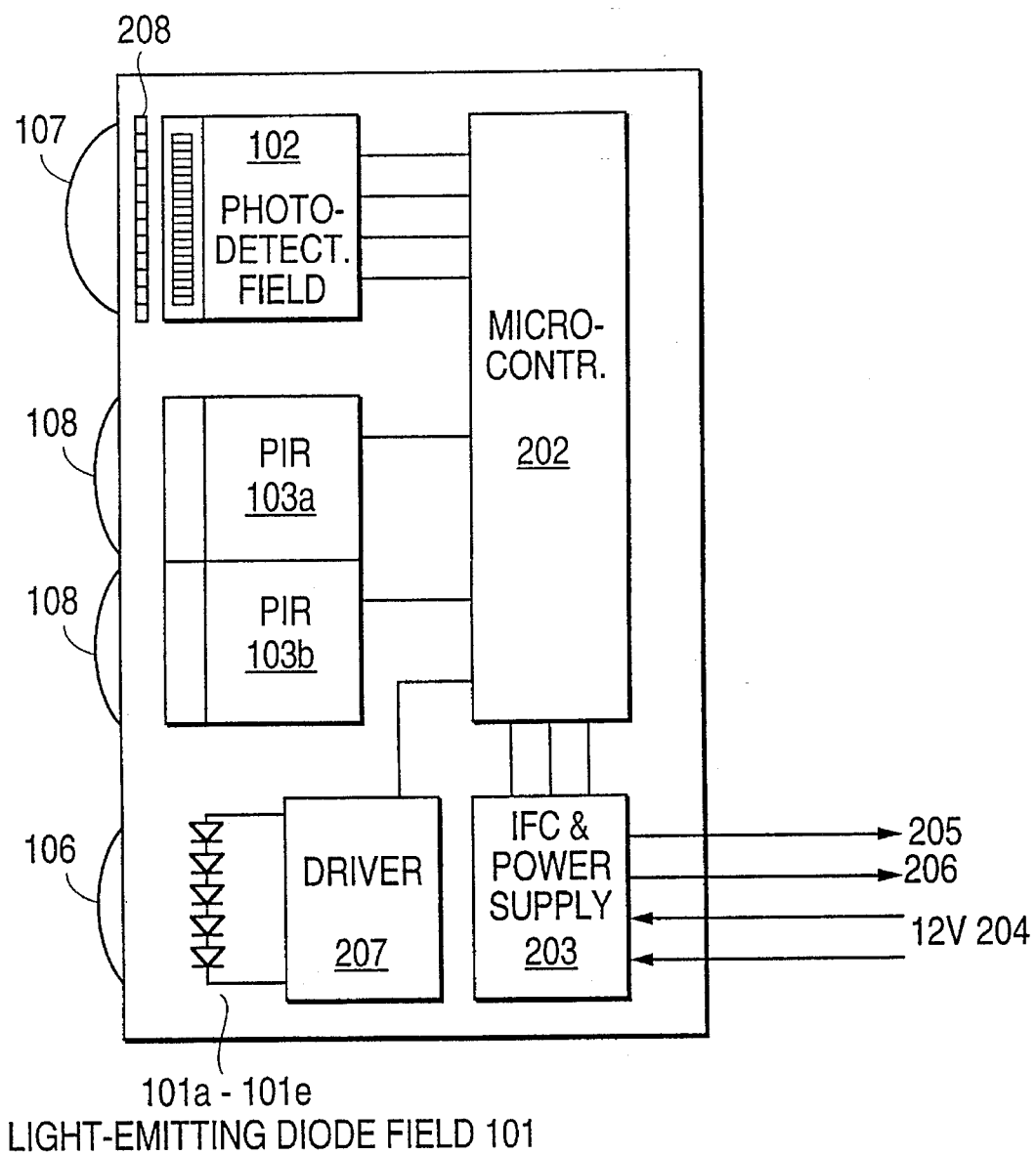
FIG. 2 is a schematic illustration of the device of FIG. 1 showing in more detail a diode field and other components.

According to FIG. 1, the arrangement for detecting the occupancy of a seat 105 comprises a field 101 of transmitters, such as light-emitting diodes 101a through 101e, which illuminate the seat 105 via the transmitting optic (e.g., lens) 106 with, for example, 5 light spots. The receiving optic (e.g., lens) 107 forms an image of the seat surface area on a linear or planar photodetector field 102. The contour of the seat is determined in a microprocessor 202 (FIG. 2) based on the geometric allocation of the seat surface area to the individual receiving surfaces of the photodetector field 102, and the following is deduced from this information:

Whether the seat is occupied or not occupied.

Whether a child seat is installed on the seat, easily recognizable because of its contour, regardless of the respective make.

Whether something is located between sensor and seat.

Whether the person has meanwhile shifted position, e.g., towards the dashboard.

In order to be able to make a distinction between persons and objects, there is provided a pyroelectric sensor 103. The pyroelectric sensor 103 comprises, for example, 2 pyroelectric films which are also imaged onto the seat via the optical units 108.

The arrangement for detecting the occupancy of a seat can be installed in the region of the dashboard, for example on the air bag actuator, or in the interior roof region, or in the region of the rearview mirror of a vehicle. The configuration of the arrangement for defecting occupancy of a seat corresponds to that in FIG. 2. A light-emitting diode field 101a through 101e is imaged, via the transmitting optic 106, this field being actuated by a driver 207 in a pulsed manner. The backscattered energy is fed to the photodetector field 102 via the receiving optic 107 and a filter 208. The distribution of the backscattered energy is stored and evaluated in the microprocessor 202. The distribution establishes the contour of the seat (or the persons or objects) as well as the distance of this contour from the photodetector field. The microprocessor has stored therein significant contours. Thus, a good distinction can be made between the most frequently occurring types of occupancy, such as a person, child seat or other object. Simultaneously, infrared emission is fed via the receiving optic 108 to the pyroelectric detectors 103a and 103b where the change is output to the microprocessor 202 for evaluation. The entire device is provided with a voltage supply and interface 203 to the vehicle. Through these elements, a voltage 204, for example, 12 V, is supplied and the output of the occupancy information takes place via logic levels on lines 205 and 206.

It will be understood that the above description of the present invention is susceptible to various modifications, changes and adaptations, and the same are intended to be comprehended within the meaning and range of equivalents of the appended claims.

What is claimed is:

1. An arrangement for detecting the occupancy of a seat comprising:

a device for the acquisition of an image of the seat; and a processor for processing the acquired image of the seat and determining whether the seat is occupied by at least one of a person or an object, or whether the seat is not occupied, wherein the device for the acquisition of the image of the seat includes:

a plurality of light emitters directed at the seat in order to form a plurality luminous spots on the seat, and a photodetector field arranged at a defined distance from the seat for detecting the luminous spots formed on the seat by the plurality of light emitters and thereby acquiring an image of the seat.

2. The arrangement for detecting the occupancy of a seat as defined in claim 1, further comprising infrared radiation detector means responsive to the presence of persons emitting infrared radiation and outputting a signal to the processor indicative thereof, the processor using the output of the infrared detector means for differentiating between the presence of persons and objects.

3. The arrangement for detecting the occupancy of a seat as defined in claim 1, wherein the device for the acquisition of an image of the seat is installed on a passenger-side air bag cover of a vehicle.

4. The arrangement for detecting the occupancy of a seat as defined in claim 1, wherein the device for the acquisition of an image of the seat is installed on an interior roof of a vehicle.

5. The arrangement for detecting the occupancy of a seat as defined in claim 1, wherein the device for the acquisition of an image of the seat is installed in the region of a rearview mirror of a vehicle.

6. The arrangement for detecting the occupancy of a seat as defined in claim 1, wherein the arrangement is installed in a vehicle, the arrangement further comprising interface means for interfacing the processor with the vehicle to provide seat occupancy information to the vehicle.

7. The arrangement for detecting the occupancy of a seat as defined in claim 1, further comprising respective optics for the plurality of light emitters and the photodetector field.

8. The arrangement for detecting the occupancy of a seat as defined in claim 2, further comprising respective optics for the plurality of light emitters, the photodetector field, and the infrared radiation detector means.

9. The arrangement for detecting the occupancy of a seat as defined in claim 1, wherein the processor stores therein a predetermined set of seat contours representing the most frequently occurring types of seat occupancy for comparison with the acquired image of the seat, the predetermined set of seat contours including a contour representing occupancy by a person, a contour representing occupancy by a child seat, and a contour representing an unoccupied seat.

10. An apparatus for evaluating seat occupancy, the apparatus comprising:

emitter means for emitting light in the direction of the seat;

detector means for detecting the emitted light returning from the direction of the seat and producing an output representative thereof; and processing means for controlling the emitter means to emit light, for receiving the output of the detector means, and for comparing the output from the detector means with a plurality of prestored contours representative of seat occupancy states to determine whether or not the seat is occupied, and if occupied, by what.

11. The apparatus for evaluating seat occupancy according to claim 10, wherein the processing means causes emitter means to emit pulsed light.

12. The apparatus for evaluating seat occupancy according to claim 10, the apparatus further comprising infrared detecting means for detecting infrared radiation in the direction of the seat and producing an output representative thereof, wherein the processing means uses the output of the infrared detecting means to determine whether the seat is occupied by a person emitting infrared radiation.

13. The apparatus for evaluating seat occupancy according to claim 12, further comprising respective optics for the emitter means, the detector means, and the infrared detecting means.

14. The apparatus for evaluating seat occupancy according to claim 12, wherein the emitter means comprises a plurality of light-emitting diodes, wherein the detector means comprises a plurality of photodetectors, wherein the infrared detecting means comprises a plurality of pyroelectric infrared sensors, and wherein the processing means comprises a microprocessor controller.

15. The apparatus for evaluating seat occupancy according to claim 10, further comprising filter means disposed between the detector means and the seat, for filtering the light incident on the detector means, whereby light emitted by the emitter means returning from the direction of the seat is passed by the filter means.

16. The apparatus for evaluating seat occupancy according to claim 10, further comprising interface and power supply means, for coupling the apparatus to a vehicle to provide electrical power to the apparatus, and for providing signals indicative of seat occupancy from the processing means to the vehicle.

17. The apparatus for evaluating seat occupancy according to claim 10, wherein the plurality of prestored contours representative of seat occupancy states include a contour representing occupancy by a person, a contour representing occupancy by a child seat, and a contour representing an unoccupied seat.

18. The apparatus for evaluating seat occupancy according to claim 10, wherein the emitter means comprises a plurality of light-emitting diodes, wherein the detector means comprises a plurality of photodetectors, and wherein the processing means comprises a microprocessor controller.

19. The apparatus for evaluating seat occupancy according to claim 10, wherein the detector means comprises one of a linear or a planar array of photodetectors.

* * * * *